United States Patent
Koran et al.

(10) Patent No.: US 7,849,027 B2
(45) Date of Patent: Dec. 7, 2010

(54) AUTOMATED CLUSTERING OF RECORDS, BIASED BY SUPERVISED CLASSIFICATION PROCESSING

(75) Inventors: Joshua Ethan Miller Koran, Mountain View, CA (US); David A. Burgess, Menlo Park, CA (US); Glen Anthony Ames, Mountain View, CA (US); Amit Umesh Shanbhag, San Francisco, CA (US); Nicholas Wayne Henderson, Stanford, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1085 days.

(21) Appl. No.: 11/550,709

(22) Filed: Oct. 18, 2006

(65) Prior Publication Data

US 2008/0097820 A1    Apr. 24, 2008

(51) Int. Cl.
*G06F 15/18*    (2006.01)
*G06E 1/00*    (2006.01)
*G06E 3/00*    (2006.01)
*G06G 7/00*    (2006.01)

(52) U.S. Cl. .................................................... 706/17
(58) Field of Classification Search .................... 706/17
See application file for complete search history.

(56) References Cited

U.S. PATENT DOCUMENTS

| | | | |
|---|---|---|---|
| 5,983,220 A | 11/1999 | Schmitt | |
| 5,986,673 A | 11/1999 | Martz | |
| 6,061,658 A | 5/2000 | Chou et al. | |
| 6,240,411 B1 | 5/2001 | Thearling | |
| 6,286,005 B1 | 9/2001 | Cannon | |
| 6,429,868 B1 | 8/2002 | Dehner, Jr. et al. | |
| 6,567,797 B1 | 5/2003 | Schuetze et al. | |
| 6,771,289 B1 | 8/2004 | Cadez et al. | |
| 6,976,212 B2 | 12/2005 | Newman et al. | |
| 7,043,463 B2 | 5/2006 | Bonabeau et al. | |
| 7,092,918 B1 | 8/2006 | Delurgio et al. | |
| 7,249,032 B1 | 7/2007 | Close et al. | |
| 7,249,033 B1 | 7/2007 | Close et al. | |
| 7,599,945 B2 * | 10/2009 | Ames et al. ......................... 1/1 |
| 7,739,229 B2 * | 6/2010 | Ames et al. ................. 707/602 |
| 7,756,900 B2 * | 7/2010 | Burgess et al. .............. 707/801 |
| 2002/0010620 A1 | 1/2002 | Kowalchuk et al. | |
| 2003/0030637 A1 | 2/2003 | Grinstein et al. | |
| 2006/0136467 A1 | 6/2006 | Avinash et al. | |
| 2006/0195356 A1 | 8/2006 | Nerenhausen et al. | |

(Continued)

OTHER PUBLICATIONS

Office Action in U.S. Appl. No. 11/564,995, mailed Mar. 11, 2009.

(Continued)

*Primary Examiner*—Michael Holmes
(74) *Attorney, Agent, or Firm*—Weaver Austin Villeneuve and Sampson LLP (57) ABSTRACT

An unsupervised classification approach is improved by imposing some order into the treatment of the records and their attributes, which otherwise would be treated as random variables. A method is provided to identify particular attributes that are most associated with the "good" records within each of the plurality of groups of records within a data set. Based on a supervised scoring method, the records of the data set are processed to indicate their measure of "goodness". There are various ways by which the records can be processed to indicate a bias during unsupervised clustering processing.

31 Claims, 5 Drawing Sheets

U.S. PATENT DOCUMENTS

2007/0027858 A1    2/2007  Weinberg et al.
2007/0094216 A1*   4/2007  Mathias et al. ................ 706/52
2008/0120307 A1    5/2008  Ames et al.

OTHER PUBLICATIONS

Office Action from U.S. Appl. No. 11/561,779, dated Apr. 2, 2009.

Notice of Allowance from U.S. Appl. No. 11/564,995, dated Aug. 7, 2009.
Final Office Action from U.S. Appl. No. 11/561,779, dated Dec. 1, 2009.
U.S. Appl. No. 11/561,779, filed Nov. 20, 2006.
U.S. Appl. No. 11/564,995, filed Nov. 30, 2006.
Office Action in U.S. Appl. No. 11/564,995, mailed Sep. 11, 2008.
Office Action from U.S. Appl. No. 11/561,779 dated Jun. 23, 2010.

* cited by examiner

Fig. 1

| | |
|---|---|
| 202a | G |
| 202b | G |
| 202c | B |
| 202d | B |
| 202e | G |
| 202f | B |
| 202g | B |
| 202h | B |
| 202i | G |
| 202j | B |
| 202k | B |
| 202l | B |
| 202m | B |
| 202n | B |
| 202o | B |
| 202p | B |

| | |
|---|---|
| 202a | G |
| 202b | G |
| 202c | B |
| 202d | B |
| 202e | G |
| 202f | B |
| 202g | B |
| 202h | B |
| 202i | G |
| 202j | B |
| 202k | B |
| 202l | B |
| 202m | B |
| 202n | B |
| 202o | B |
| 202p | B |
| 202a' | G |
| 202a" | G |
| 202b' | G |
| 202b" | G |
| 202e' | G |
| 202e" | G |
| 202i' | G |
| 202i" | G |

| | |
|---|---|
| 202a | G |
| 202b | G |
| 202e | G |
| 202j | B |
| 202m | B |
| 202f | B |
| 202g | B |

AUTOMATED CLUSTERING OF RECORDS, BIASED BY SUPERVISED CLASSIFICATION PROCESSING

BACKGROUND

It is useful to determine a set of attributes that identify a "good" target audience in relation to achieving some marketing goal, such as acquisition, retention or monetization. Conventionally, such a determination has been made primarily by analyzing how various attributes (such as declared or inferred attributes of user interaction with an online service) of dataset records' are correlated to a predetermined measure of success (such as click-through rates, registration rates or purchase activity) in an attempt to determine which attributes are most associated with "good" records.

In accordance with a conventional supervised classification approach, target objectives are classified by humans into "positive" (e.g., revenue greater than $10) and "negative" (e.g., profit less than $0) measures of "goodness." All records are then marked with their target objective value. The thus-classified records are then used to create a scoring algorithm that ranks the importance of the record attributes as predictors of the target objective. There is a substantial risk, however, that the distribution of heterogeneous clusters of records within the data (e.g., attributes associated with males have a different correlation with the target objective than those associated with females) will disadvantageously bias the resulting rank of input attributes.

On the other hand, in an unsupervised classification approach, the classification of records employs statistical processing to group together sets of similar records without regard to the meaning associated with their attributes. In the statistical processing, the records' attributes are essentially treated as random variables, with no a priori assumptions about their usefulness as targeting attributes. This can result in groupings of records that, while consistent with the statistical processing, are incongruous with a meaningful marketing segmentation (e.g., each cluster is more likely to have a homogenous distribution of "good" records as the number of attributes in the data set not correlated with the target objective increases).

SUMMARY

An unsupervised classification approach is improved by imposing some order into the treatment of the records and their attributes, which otherwise would be treated as random variables. A method is provided to identify particular attributes that are most associated with the "good" records within each of the plurality of groups of records within a data set. Based on a supervised scoring method, the records of the data set are processed to indicate their measure of "goodness". This "goodness" indication can be binary (i.e. "good" or "bad"), categorical (e.g., "best", "better than average", "average", "worse than average" and "worst") or continuous (i.e. "best" to "worst"). The "goodness" indication may be the result of a function of one or more attributes. The correlation of each input attribute with the success measure may be used to bias the clustering processing. The attributes used in the correlation analysis may be limited (e.g., only a selected subset of the attributes able to be determined prior to the measure of the objective, such as revenue cannot be pre-determined for the goal of purchase rate, OR limited to the subset of targetable attributes, such as those attributes that can used for targeting in a marketing campaign).

Processing the records to introduce a bias into the clustering may include, for example, weighting all or a subset of attributes of particular ones of the records in the data set. Such weighting may further include replicating all or a subset of records within the data set. Such weighting may further include removing a subset of records within the data set. Such weighting may further include removing or ignoring a subset of attributes within the dataset, such that these attributes are not considered by the clustering algorithm during the clustering phase. The replication of records and weighting of attributes in the data set may be a function of the exhibited particular desirable characteristics represented by the records.

In another example, processing the records to indicate a bias may also include altering at least one dimension of a data space (e.g., by expanding or compressing, linearly or non-uniformly) to which the attributes correspond. The ratio of "good" records to "bad" records for each value of each attribute may be used to create an index that may be used to weight that dimension in the clustering. The bias of attributes may be based upon a function of the cost to target with that attribute's category or cost to gather the information related to that category.

Yet another example of processing the records to indicate a bias includes deriving a plurality of data subsets, each data subset including a plurality of records such that a ratio of high scoring "good" records to low scoring "bad" records in each subset is a more useful proportion than the original ratio within the data set. Altering the ratio of "good" to "bad" records will bias the weight given to the attributes contained by "good" records. The data subsets can be used in conjunction with the methods already mentioned and the results from each data subset are combined to achieve a clustering of the records of the complete data set. The clustering may use only a subset of attributes associated with each record, whereby the attributes may be restricted by those that can be known prior to the measure of "goodness" or those that can be used in a targeting system.

DETAILED DESCRIPTION OF THE PREFERRED EMBODIMENTS

The inventors have realized that an unsupervised classification approach may be improved by imposing some order into the treatment of the records and their attributes, which otherwise would be treated as random variables. As described in detail below, in accordance with an aspect, an unsupervised clustering of data records is biased based at least in part on a user-provided success metric, where the user-provided success metric may be thought of as providing guidance to the unsupervised clustering as to what attributes of the data set are considered to be general differentiators of "goodness." The described method may be carried out, for example, in a programmed computing system.

By achievement of the identification of "good" records, such as identification of users most likely to contribute to achievement of a particular marketing goal (such as, for example, acquisition, retention, monetization, etc.), market-driven advertising campaigns may be carried out more effectively. Media providers, such as online service providers, can potentially garner additional monetization (e.g., for advertisements targeted based on the attribute identifications). It is thought that the biased unsupervised approach provides a more effective identification of target attributes than either a solely supervised scoring or solely unsupervised clustering approach.

Figure 1:
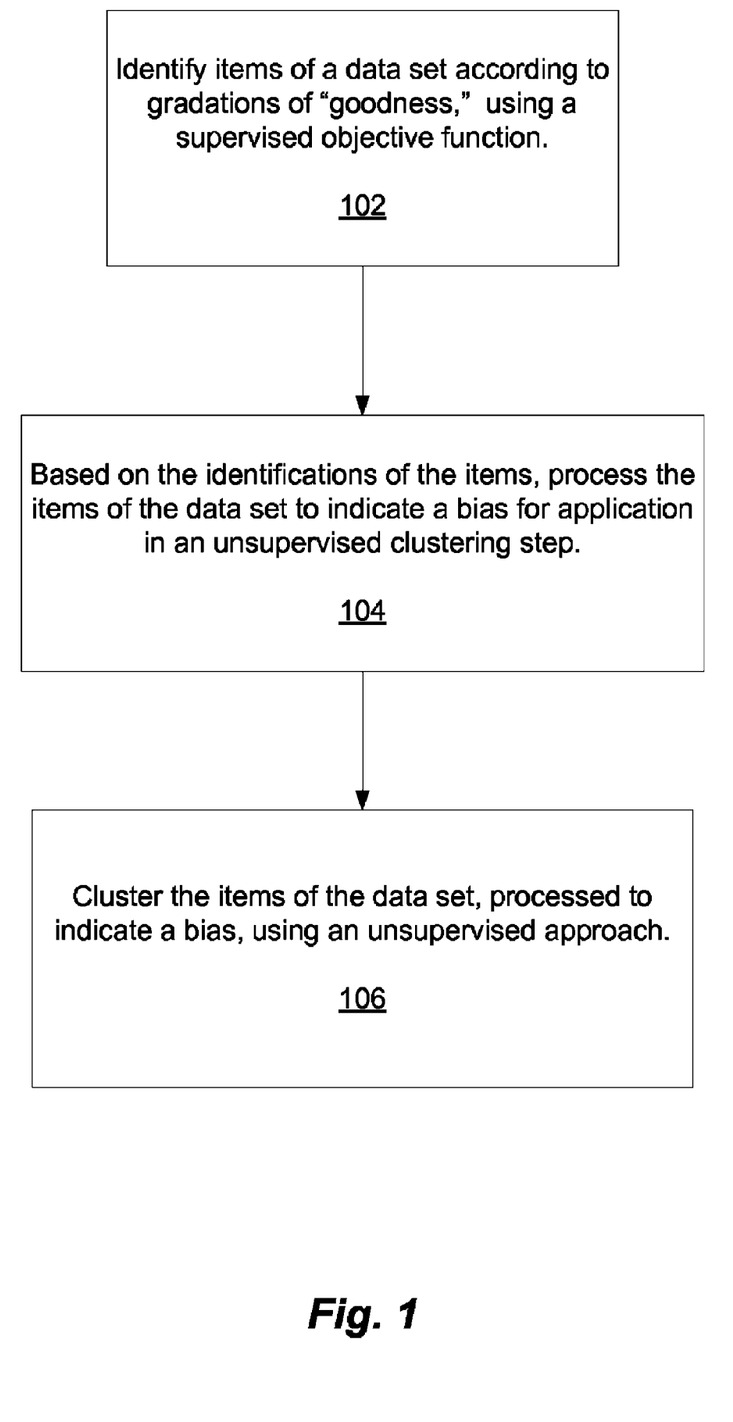
FIG. 1 is a flowchart illustrating a method in which unsupervised clustering processing is biased based on results of a supervised classification.

FIG. 1 is a flowchart illustrating a method in accordance with this aspect. After describing FIG. 1, we provide some illustrative examples of this aspect. Referring now to FIG. 1, at step 102, records of a data set are characterized according to either a binary measure of or gradations of "goodness," using a supervised objective function. Typically, a metric for the gradations of goodness is provided by an expert user (such as a marketing expert) and is indicative of human judgment as to, for each record, what criteria (e.g., attributes and values of attributes) contribute to the success and/or failure of particular marketing goals. As an example, a success metric may be a binary metric—e.g., indicating that presence or absence of a particular attribute (e.g., purchase event), or that a particular attribute having a particular value or a value within a particular range, indicates good or bad (e.g., profitable activity) or better or worse (e.g., click-through rate).

As another example, a success metric may indicate more than one value or range of values with, for example, each value or range being an indicator of a different amount to which an attribute having this value or with the value in this range indicates good (or bad). The success metric may even indicate goodness (or badness) as a continuous function of values of a particular attribute.

A single success metric may be defined relative to a combination of attributes as well, such that the values of all the attributes of the combination of attributes contribute to the goodness indication for a record (considering the attributes as having discrete values, being within a range of continuous values, as being ordinal, or some combination thereof).

With respect to users of services via the Internet, as an example, attributes may be stored in columns associated with each record that are indicative of characteristics of users and/or activities of users with respect to a service or group of services provided via the Internet. As an additional example, the attributes for users may also be accessible from profile databases that hold user-provided information and/or information otherwise obtained. In such case, each record is marked by a unique identifier (such as a browser cookie or a user-supplied registration name).

At step 104, the data set is processed based on the characterization to indicate a bias, to bias an unsupervised clustering step. At step 106, the records of the data set are clustered using an unsupervised approach, with the clustering processing being biased according to the indicated bias indicated at step 104.

That is, in essence, the clustering is biased in accordance with the supervised classification such that, for example, to the extent an attribute or combination of attributes differentiates the records in terms of goodness (or badness) or lower cost, then the value of that attribute or values of the attributes of the combination of attributes may cause the clustering operations of the clustering algorithm to be biased such that records indicated as having similar attributes and a similar level of goodness, as indicated by the goodness-differentiating attributes, are more likely to be clustered together.

In other words, the clustering processing is more biased to cluster records that are characterized by the attributes or combinations of attributes that have been determined to indicate similar levels of goodness. In some examples, on the other hand, the attributes may be used to influence the clustering such that records having a dissimilar level of goodness are less likely to be clustered together. In this way, user input as to the effect of particular attributes or combinations of attributes may affect, but does not necessarily dominate, the clustering process.

Optionally, cost metrics may also be supplied to bias the clustering process. The cost metrics are metadata about one or more of the attributes, such as being indicative of a price to target particular criteria (or, perhaps, combinations of criteria), independent of the "goodness" or "badness" indicated by the criteria. With respect to cost, in one example, the clustering algorithm operates such that the higher the cost to target a particular attribute or combination of attributes, the less likely the value of that particular attribute is to influence the clustering.

Figure 2:
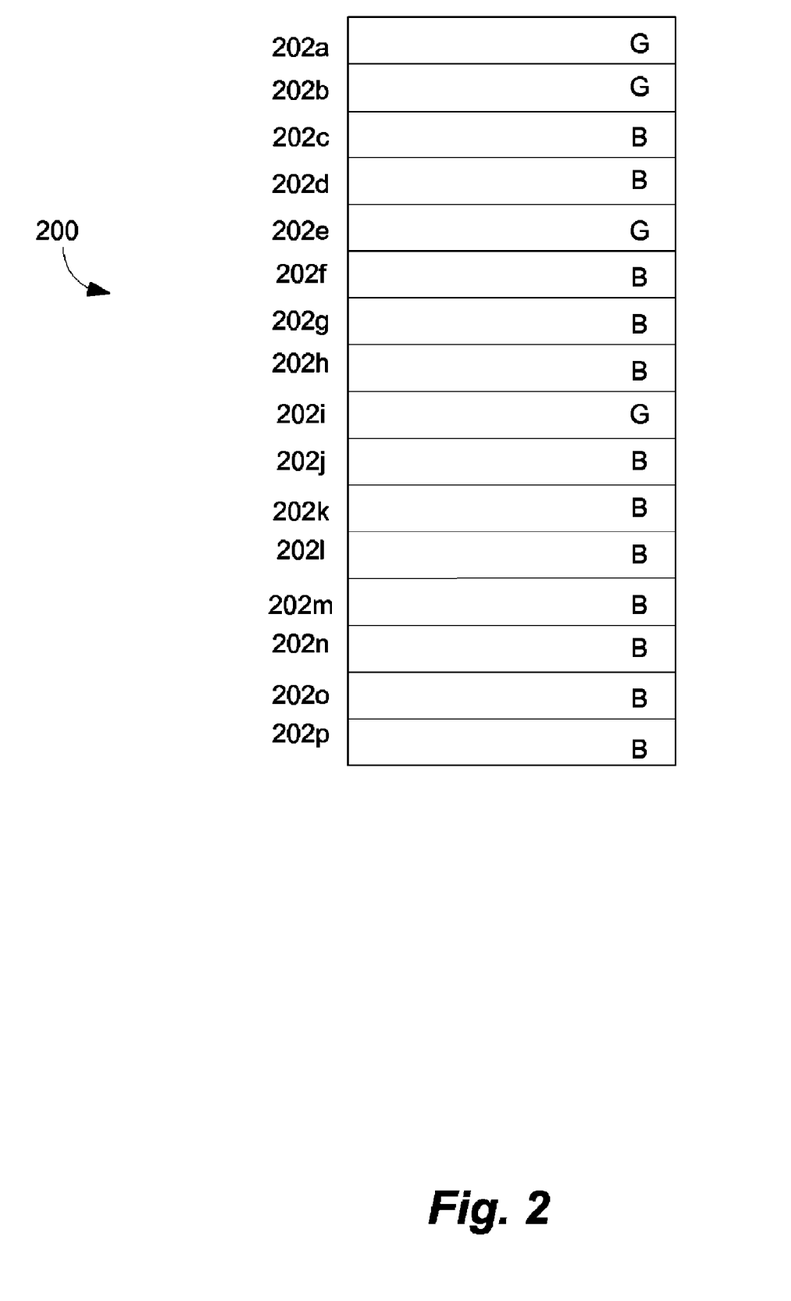
FIG. 2, which is a schematic of a data set of records.

We now discuss several particular examples of how a data set may be processed to indicate a bias. To illustrate the examples, we refer to FIG. 2, which is a schematic of a data set 200 of records 202a to 202p. The number of records is assumed in the example to be sixteen for simplicity of illustration but, in practice, there may be millions or more of such records (e.g., if the records each indicate a user of a particular internet-based service, such as search and/or e-mail). Further, it is assumed that the records 202 of the data set 200 have been identified according to a binary indication of "goodness," with "G" indicating "good" and "B" indicating "bad". This is in accordance with step 102 of the FIG. 1 flowchart, for example. In the FIG. 2 example, the records 202a, 202b, 202e and 202i have been indicated with "G," and the remaining records have been indicated with "B."

Figure 3:
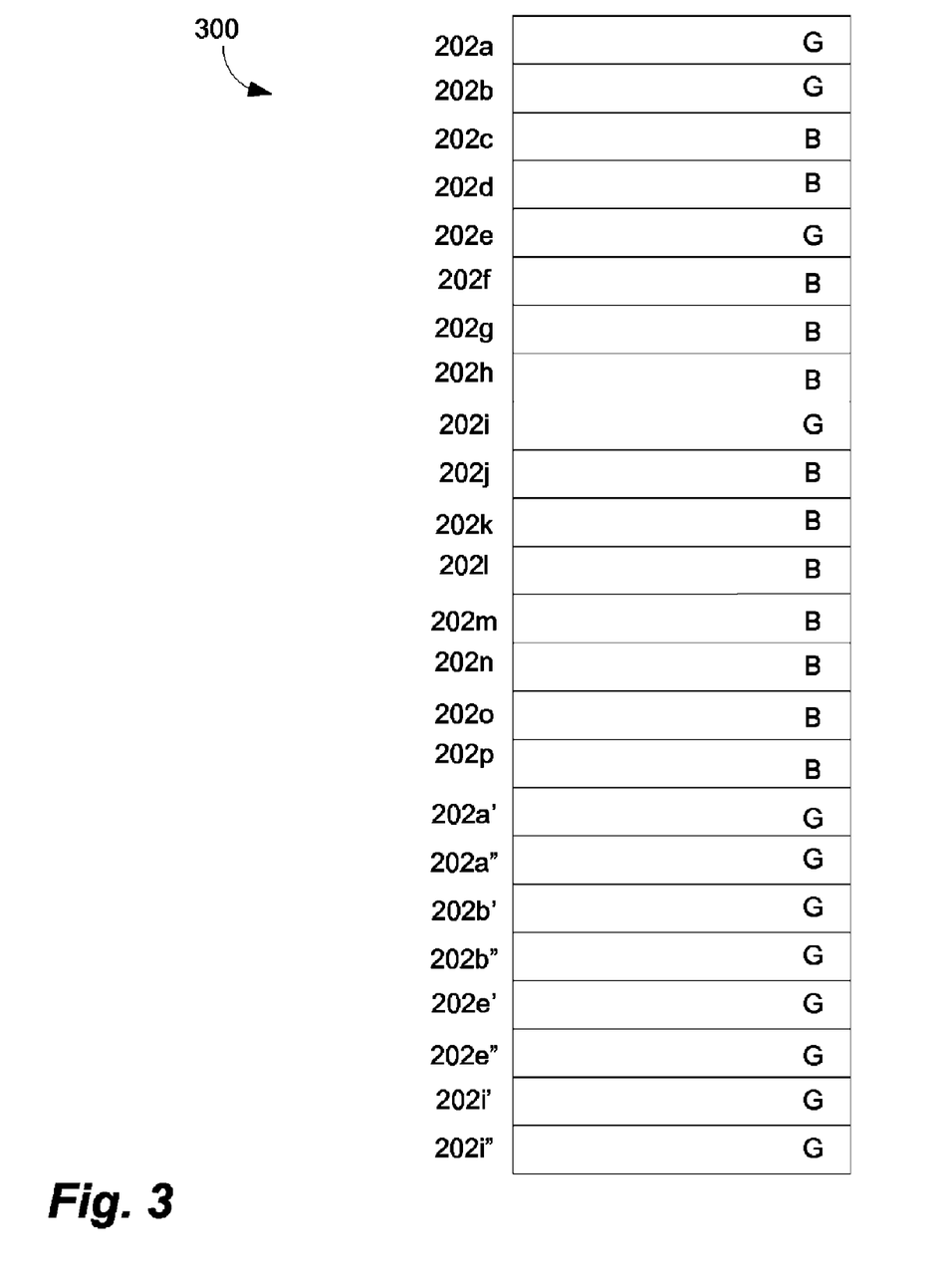
FIG. 3 illustrates an example of replicating records of the data set to indicate bias.

FIG. 3 illustrates a first example of a result of the data set 200 being processed to indicate bias. In accordance with the FIG. 3 example, the records 202 indicted as good ("G") are replicated, to enhance the presence of the good records over the bad records. Thus, for example, the processed data set 300 is the same as the data set 200, except that the records 202a, 202b, 202e and 202i have each been replicated two times. (The first copy is indicated with a single apostrophe and the second copy is indicated with a double apostrophe). As a result, during the unsupervised clustering processing, those good records, having been replicated, will have a greater effect on the unsupervised clustering processing.

In a variation of the FIG. 3 example, the good/bad indication may have more than two values, such that a degree of goodness may be indicated rather than a simple binary indication. In such a case, the number of times a particular record is replicated or weighted may be related to the degree of goodness indicated by the good/bad indication.

In accordance with a further example, the data set being processed to indicate bias includes identifying a transformation to be applied in one or more dimensions of each record of the data set. That is, each record attribute may be thought of as an independent dimension of "space," where the values of the record attributes define a point in space where that record exists. Thus, for example, for a particular set of attribute values that are indicated by an expert to be "good" or "bad," one or more of the attribute dimensions most correlated with the measure of "goodness" is stretched or collapsed, as appropriate, in order to make a value threshold harder or fuzzier, which correspondingly affects the operation of the unsupervised clustering processing with respect to grouping records. Similarly, where the expert judgment is that a combination of attributes is indicative of goodness or badness, then a space (i.e., a plurality of dimensions) corresponding to that combination of attributes may each be stretched or collapsed.

Figure 4A:
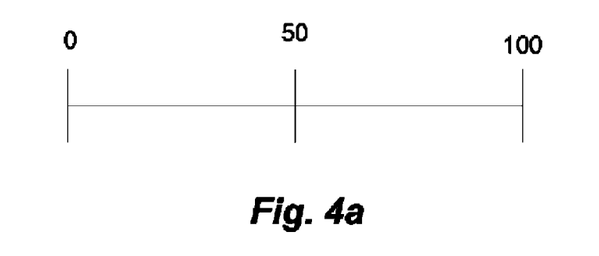
FIGS. 4A and 4B illustrate an example of dimension stretching/collapsing to indicate bias.
Figure 4B:
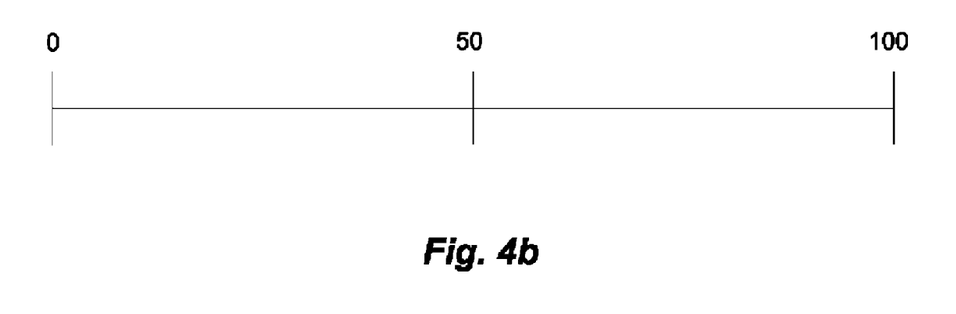

The stretching/collapsing may be uniform across the dimension(s), as illustrated by the example in FIG. 4A and FIG. 4B. FIG. 4A illustrates a dimension before stretching, whereas FIG. 4B illustrates the same dimension after stretching. The stretching/collapsing may be also be nonlinear or otherwise non-uniform, based on what effect is desired to the unsupervised clustering processing.

In accordance with yet another example, the data set being processed to indicate bias includes deriving a plurality of one or more new data sets based on the original data set, with the processing resulting in the derived new data sets having a better ratio of good records to bad records. In one example, each such data set is derived by using a subset or all of the good records from the original data set and also using a random or other sampling of the bad records from the original data set. Because standard statistics use a minimum number of good and bad records to identify correlations, altering this ratio improves the ability of finding these correlations. In one example, the good records in the derived data set have a greater presence than the bad records, as compared to the original data set. The difference in the ratio of good to bad records contributes to the bias.

Figure 5:
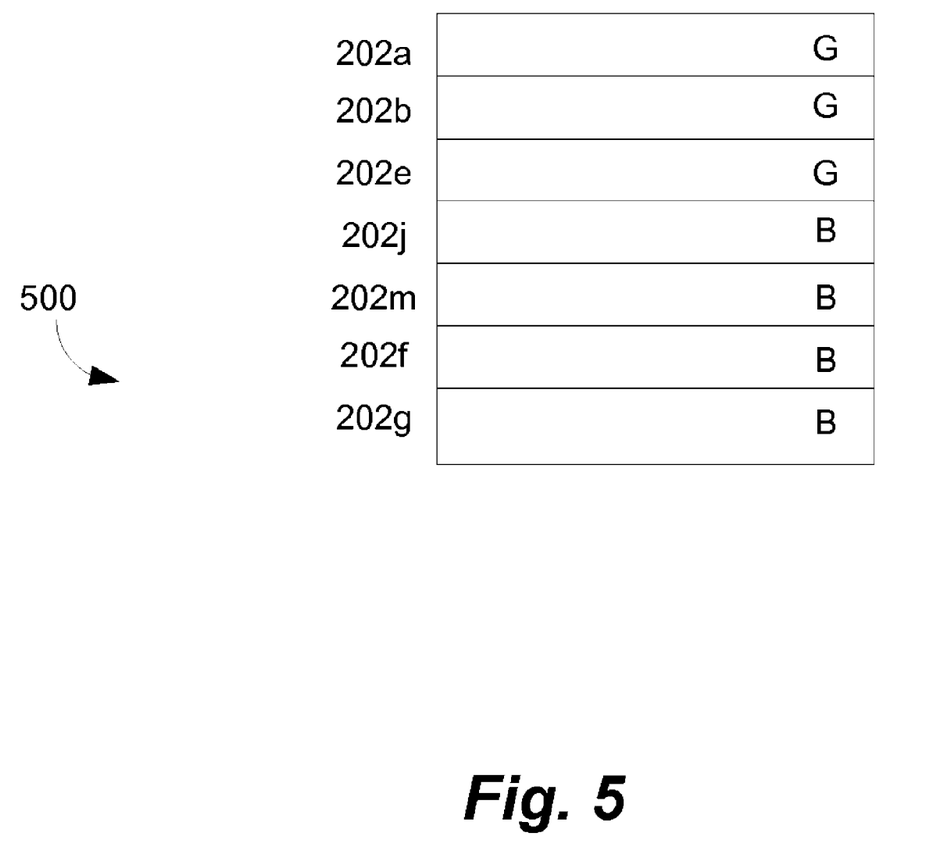
FIG. 5 illustrates an example of deriving new data sets to indicate bias.

An example of one of new data sets, derived from the original data set 200 (FIG. 2), is illustrated in FIG. 5. While the original data set 200 has 4/16 (25%) of the records being good records, the derived new data set has 3/7 (43%) of the records being good records. This is perhaps an exaggerated example, since a typical original data set may have millions of records and, therefore, the resolution of available bias is typically much greater than that available using the example original data set 200. An advantage of using the derived new data set approach is that the processing of the derived new data sets may be distributed across multiple computers, for example, one derived new data set per computer.

The unsupervised clustering process may be standard, with unsupervised clustering performed on each derived new data set, and then the clustered "sub" results are combined using standard statistical processing.

We now discuss how a system can automatically recommend a desirable number of clusters within a data set from multiple alternative clusterings. The clustering may generate multiple different numbers of output clusters, whereby a subsequent method is used to select the ideal number of clusters. The set of attributes that are highly correlated with the "good" records within each cluster (for clusters containing mostly "good" records) and the set of attributes that are highly correlated with "bad" records within each cluster (for clusters containing mostly "bad" records) can be used as an automated description of each cluster.

A method is described to identify a desirable number of clusters within a data set. Unsupervised clustering assigns each record to a single cluster, by either partitioning or agglomerating the records of the data set. Conventionally, the number of clusters in the data set is determined when the distance between clusters (either centroids or edges), whose average distance decreases with the addition of each new cluster, decreases less than the average decrease in distance for all previous additions (i.e. when an inflection point in distance is observed when plotted against the number of clusters). Because this distance function does not take into consideration the distribution of "good" and "bad" records within each cluster, it may not be as desirable as an alternate number of clusters that contains an alternate ratio of "good" and "bad" records within each cluster. The ratio of "good" to "bad" records per cluster may be used to determine the desirable number of clusters within a dataset. The ratio of value (e.g., sum of revenue) rather than the count (e.g., count of customers) of "good" to "bad" records may be used to determine the desirable number of clusters within a dataset. In addition to the ratio determination, the number of "good" records in the clusters containing the greatest ratio of "good" to "bad" records may be used to determine the desirable number of clusters within a dataset. The function to determine the "best" clustering may rely on either an average or maximization formula of the aforesaid mentioned ratio and/or number of "good" records per cluster in each clustering. Alternately, the number of "bad" records can be used in the above methods to determine the best clustering.

In a specific example, the "best" clustering is determined via either an average or maximization function of the ratio and number/value of good and bad records within each cluster for each clustering. In one example, to determine the average function, each cluster's ratio of good and "bad" records is multiplied by a function of the number or value of the good records, the results from which are averaged:

$$\sum_{x \in X} \frac{f(x)}{|X|}, \text{ where } X = \left\{ \left( \frac{\text{good}}{\text{bad}}, \text{good} \right) \right\}$$

where |X| is equal to the number of clusters and the function incorporates the user-defined weighting between ratio of good to bad and number of good records per cluster.

To determine the maximization function, the maximum is sought of each cluster's ratio of good and "bad" records when multiplied by a function of the number or value of the good records.

$$\max_{x \in X} f(x), \text{ where } X = \left\{ \left( \frac{\text{good}}{\text{bad}}, \text{good} \right) \right\}$$

The function f(x) incorporates the user-defined weighting between ratio of good to bad and number of good records per cluster. In an alternate example, the "best" clustering can be determining by reference to the "bad" records using either an average or minimization of "bad" records in place of the two formulas above.

We now discuss how a system can automatically rank the utility of each cluster to achieving the pre-specified marketing goal. Once the clusters have been determined, the utility of each cluster to achieving a marketing goal may be ranked. The number or value of "good" records in each cluster, and the ratio of "good" to "bad" records per cluster may both be used to determine the utility of each cluster. Alternately, the distance between the centroid of each cluster and the centroid of only "good" records within that cluster may both be used to determine the utility of each cluster. When the distance between the centroid of a given cluster and the centroid of only "good" records within that cluster is minimal, the ratio of "good" to "bad" records is skewed in favor of "good" records. When the distance between centroids is large, the ratio of "good" to "bad" records within that cluster is skewed in favor of "bad" records. By using this distance measure and the total number of "good" records in each cluster, the rank order of each cluster can be determined.

Another ranking method includes determining the dissimilarity between "good" records in a cluster and all records in the dataset, other records in the dataset or all records in other clusters. The clusters with the highest dissimilarity will be cluster with the highest rank. Alternately a user-defined weighting between the aforementioned ratio and number of "good" or "bad" records per cluster may be used to rank the clusters. To determine the "best" clustering, ratios can be compared to the entire dataset (inclusive or exclusive of the cluster being compared) or to other clusters. By using either the ratio approach or the distance measure approach and the total number of "good" records in each cluster, the rank order of each cluster can be determined.

We now discuss how a system can automatically provide a meaningful description for each cluster within a given clustering. For any given clustering, a useful description of each cluster may be automatically created. With any given clustering, each cluster generally has a different distribution of records for nearly every attribute. By determining the top n attributes that distinguish each cluster from all others, where n is smaller than the number of attributes, each cluster can be assigned a description that meaningfully differentiates it from other clusters. For each attribute, an "index" can be calculated whereby the ratio of records with that attribute (e.g., male) to the record count per cluster is divided by the ratio of that attribute to the count of records in the entire dataset. An index value of 1.0, means that the ratio of records for a given attribute in a given cluster is equal to the average ratio of that attribute within the entire dataset. An index value less than 1.0, means that the ratio of records for a given attribute in a given cluster is less than the average ratio of that attribute within the entire dataset. An index value greater than 1.0, means that the ratio of records for a given attribute in a given cluster is greater than the average number of records in all clusters for that attribute. By using the top n attributes with the highest index values per cluster, a meaningful description can be created for each cluster. In one example, the number of attributes used in the description may be automatically calculated by minimizing the number of attributes used while maximizing the distinct count of records per cluster than contain that attribute. Thus, if 80% of a given cluster's records had the attribute "male", selecting only that one attribute would provide a distinct count of 80% of the records of that cluster. In another example, the user can choose which attributes to select for description of each cluster, whereby the count of distinct records per cluster is updated to reflect how many records contain that set of attributes.

What is claimed is:

1. A method of targeting particular service users, wherein characteristics of the users are represented in a plurality of records of a data set, the method comprising:
   identifying records of the data set representing users who have exhibited particular desirable characteristics, based on supervised classification processing;
   based on identification of the records, processing the records of the data set to indicate a bias for application in unsupervised clustering processing; and
   clustering the records, processed to indicate a bias, using the unsupervised clustering process, including determining a particular clustering among alternate possible clusterings of the records of the data set; and
   targeting particular service users based on the result of the clustering step.

2. The method of claim 1, wherein:
the step of processing the records to indicate a bias includes replicating particular ones of the records in the data set.

3. The method of claim 2, wherein:
replicating or weighting particular ones of records in the data set includes replicating or weighting particular ones of the records a number of times that is a function of the exhibited particular desirable characteristics represented by the replicated records.

4. The method of claim 1, wherein:
the step of processing the records to indicate a bias includes altering or removing at least one dimension of a data space to which the records correspond.

5. The method of claim 4, wherein:
altering at least one dimension of a data space to which the records correspond includes altering at least one dimension corresponding to one of the particular desirable characteristics.

6. The method of claim 1, wherein:
the step of processing the records to indicate a bias includes deriving a plurality of data subsets, each data subset including a plurality of records such that a relationship between the records of that data subset indicates the bias; and
the clustering step including separately clustering the records of the data subsets using an unsupervised clustering process and combining the clusters to achieve clustering of the records of the data set.

7. The method of claim 6, wherein the data subsets are clustered in a distributed manner on a plurality of computing devices.

8. The method of claim 1, wherein:
targeting particular service users based on the result of the clustering step includes determining a particular cluster of records and targeting the particular service users represented by the records of the determined particular cluster.

9. The method of claim 1, wherein:
for each possible clustering of records, processing, for each cluster of that possible clustering of records of the data set, a comparison of records of the data set representing users who have exhibited the particular desirable characteristics versus records of the data set representing users who have not exhibited the particular desirable characteristics and, based thereon, determining one of the possible clustering of records to be the particular clustering.

10. The method of claim 9, wherein:
determining the particular clustering of records includes determining which of the possible clustering of records exhibits optimum comparisons for the clusters of that possible clustering.

11. The method of claim 10, wherein:
determining which of the possible clustering of records exhibits optimum comparisons for the clusters of that possible clustering includes, for the comparisons for each possible clustering, considering an overall property of each cluster of that possible clustering.

12. The method of claim 11, wherein:
the overall property of a cluster of a possible clustering includes a number of records of that cluster that exhibit the desirable characteristics.

13. The method of claim 11, wherein:
the overall property of a cluster of a possible clustering includes a number of records of that cluster that do not exhibit the desirable characteristics.

14. The method of claim 1, wherein:
targeting particular service users based on the result of the clustering step includes ranking the clusters of records and, based thereon, determining one or more of the clusters of records and targeting particular service users represented by the records of the determined one or more clusters of records.

15. The method of claim 14, wherein:
ranking the clusters of records includes
for each cluster, comparing records of the data set representing users who have exhibited the particular desirable characteristics versus records of the data set representing users who have not exhibited the particular desirable characteristics; and
processing an indication of results of the records comparing for each cluster, to determine the ranking of the clusters.

16. A computing system configured to execute the method of claim 1.

17. A computer program product for targeting particular service users, wherein characteristics of the users are represented in a plurality of records of a data set, the computer program product comprising at least one computer-readable medium having computer program instructions stored therein which are operable to cause at least one computing device to:
identify records of the data set representing users who have exhibited particular desirable characteristics, based on supervised classification processing;
based on identification of the records, process the records of the data set to indicate a bias for application in unsupervised clustering processing; and
cluster the records, processed to indicate a bias, using the unsupervised clustering process, including determining a particular clustering among alternate possible clusterings of the records of the data set; and
target particular service users based on the result of the clustering step.

18. The computer program product of claim 17, wherein:
the computer program instructions operable to cause the at least one computing device to process the records to indicate a bias include computer program instructions operable to cause the at least one computing device to replicate particular ones of the records in the data set.

19. The computer program product of claim 18, wherein:
the computer program instructions operable to cause the at least one computing device to replicate particular ones of records in the data set includes computer program instructions operable to cause the at least one computing device to replicate or weight particular ones of the records a number of times that is a function of the exhibited particular desirable characteristics represented by the replicated or weighted records.

20. The computer program product of claim 17, wherein:
the computer program instructions operable to cause the at least one computing device to process the records to indicate a bias includes computer program instructions operable to cause the at least one computing device to alter at least one dimension of a data space to which the records correspond.

21. The computer program product of claim 20, wherein:
computer program instructions operable to cause the at least one computing device to alter at least one dimension of a data space to which the records correspond includes computer program instructions operable to cause the at least one computing device to alter at least one dimension corresponding to one of the particular desirable characteristics.

22. The computer program product of claim 17, wherein:
computer program instructions operable to cause the at least one computing device to process the records to indicate a bias includes computer program instructions operable to cause the at least one computing device to derive a plurality of data subsets, each data subset including a plurality of records such that a relationship between the records of that data subset indicates the bias; and
computer program instructions operable to cause the at least one computing device to cluster includes computer program instructions operable to cause the at least one computing device to separately cluster the records of the data subsets using an unsupervised clustering process and combine the clusters to achieve clustering of the records of the data set.

23. The computer program product of claim 22, wherein:
the computer program instructions are operable to cause the at least one computing device to process the data subsets clustered in a distributed manner on a plurality of computing devices.

24. The computer program product of claim 17, wherein:
the computer program instructions operable to cause the at least one computing device to target particular service users based on the result of the clustering includes computer program instructions operable to cause the at least one computing device to determine a particular cluster of records and target the particular service users represented by the records of the determined particular cluster.

25. The computer program product of claim 17, wherein the computer program instructions operable to cause the at least one computing device to determine the particular clustering includes:
for each possible clustering of records, computer program instructions operable to cause the at least one computing device to process, for each cluster of that possible clustering of records of the data set, a comparison of records of the data set representing users who have exhibited the particular desirable characteristics versus records of the data set representing users who have not exhibited the particular desirable characteristics and, based thereon, to determine one of the possible clustering of records to be the particular clustering.

26. The computer program product of claim 25, wherein:
the computer program instructions operable to cause the at least one computing device to determine the particular clustering of records includes computer program instructions operable to cause the at least one computing device to determine which of the possible clustering of records exhibits optimum comparisons for the clusters of that possible clustering.

27. The computer program product of claim 26, wherein:
the computer program instructions operable to cause the at least one computing device to determine which of the possible clustering of records exhibits optimum comparisons for the clusters of that possible clustering includes, for the comparisons for each possible clustering, computer program instructions operable to cause the at least one computing device to consider an overall property of each cluster of that possible clustering.

28. The computer program product of claim 27, wherein:
the overall property of a cluster of a possible clustering includes a number of records of that cluster that exhibit the desirable characteristics.

29. The computer program product of claim 27, wherein:
the overall property of a cluster of a possible clustering includes a number of records of that cluster that do not exhibit the desirable characteristics.

30. The computer program product of claim 17, wherein:
the computer program instructions operable to cause the at least one computing device to target particular service users based on the result of the clustering step includes computer program instructions operable to cause the at least one computing device to rank the clusters of records and, based thereon, determine one or more of the clusters of records and targeting particular service users represented by the records of the determined one or more clusters of records.

31. The computer program product of claim 30, wherein:
the computer program instructions operable to cause the at least one computing device to rank the clusters of records includes computer program instructions operable to cause the at least one computing device to for each cluster, comparing records of the data set representing users who have exhibited the particular desirable characteristics versus records of the data set representing users who have not exhibited the particular desirable characteristics; and process an indication of results of the records comparing for each cluster, to determine the ranking of the clusters.

* * * * *